Feb. 12, 1924.
J. A. CALDER
1,483,073
RIVET CUTTING MACHINE
Filed July 13, 1921
5 Sheets-Sheet 3
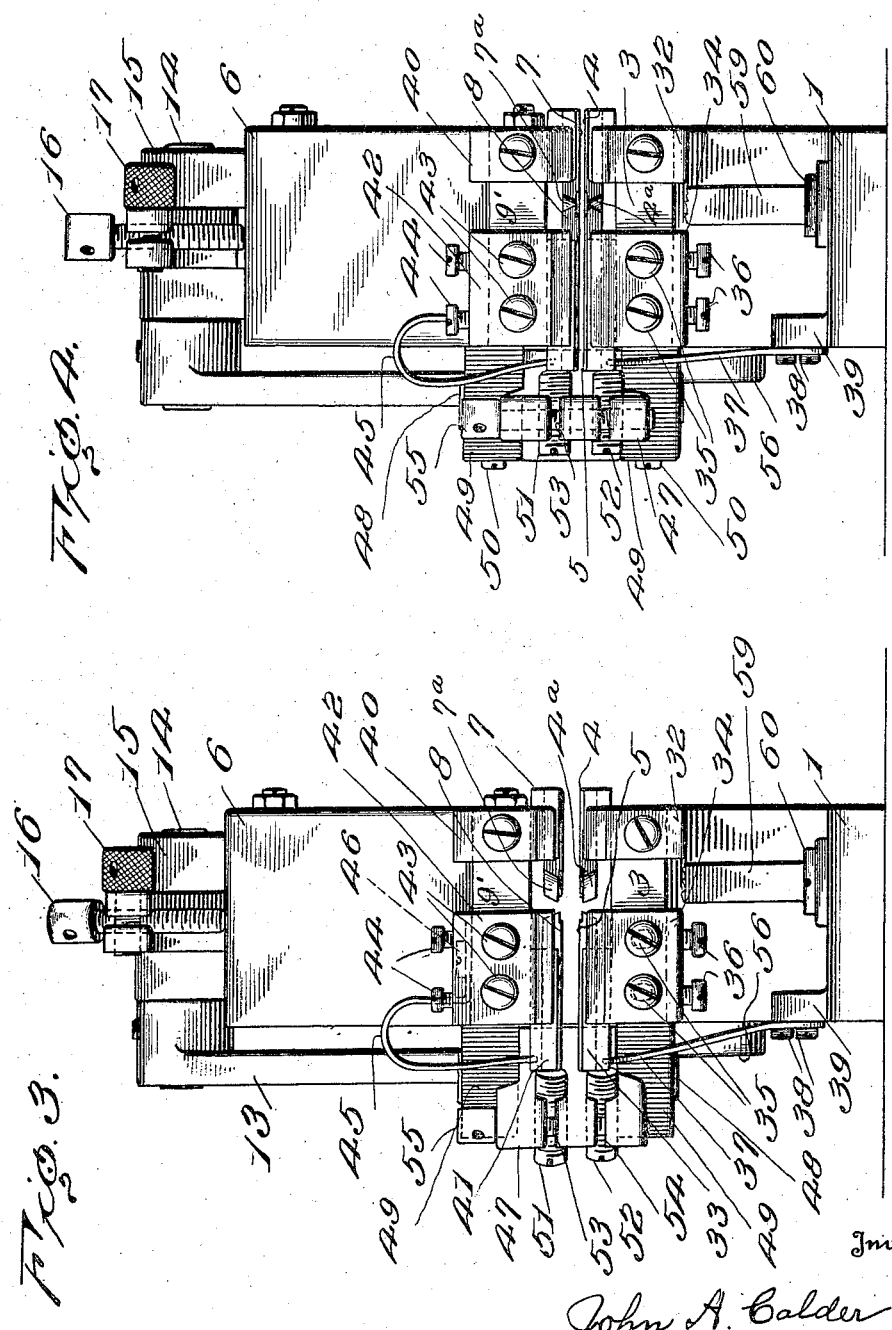
Inventor
John A. Calder
By Sturtevant & Mason
Attorneys

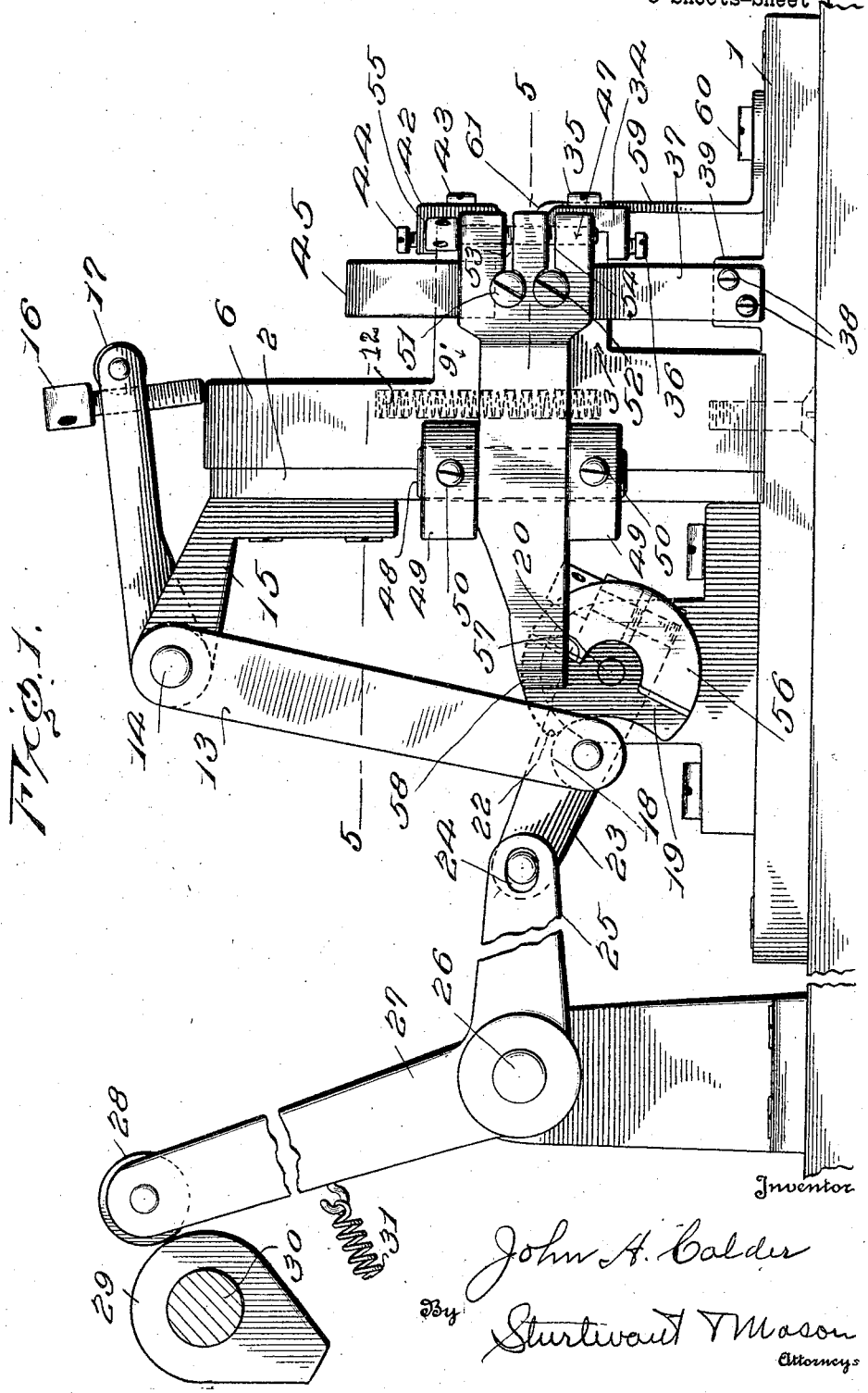

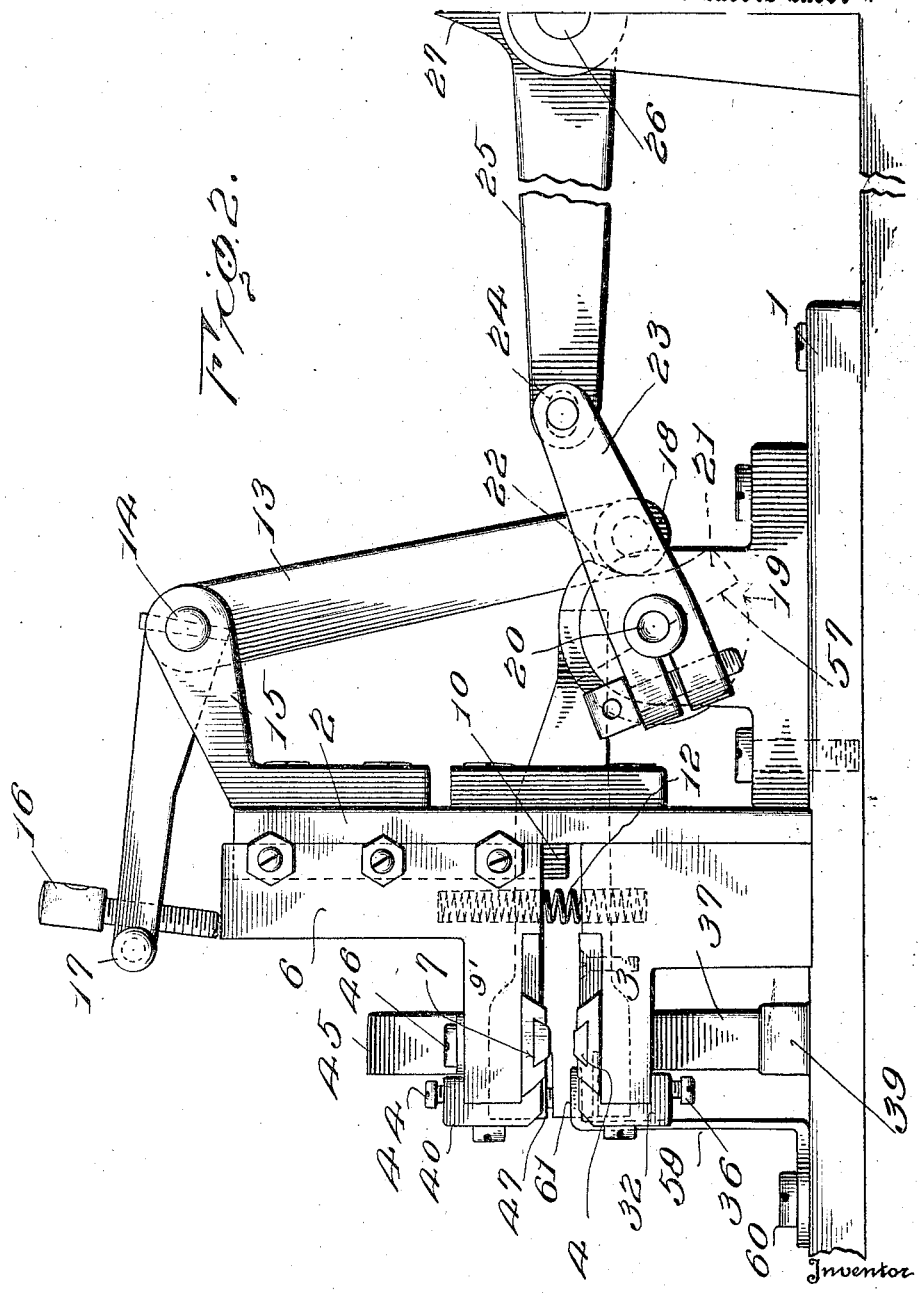

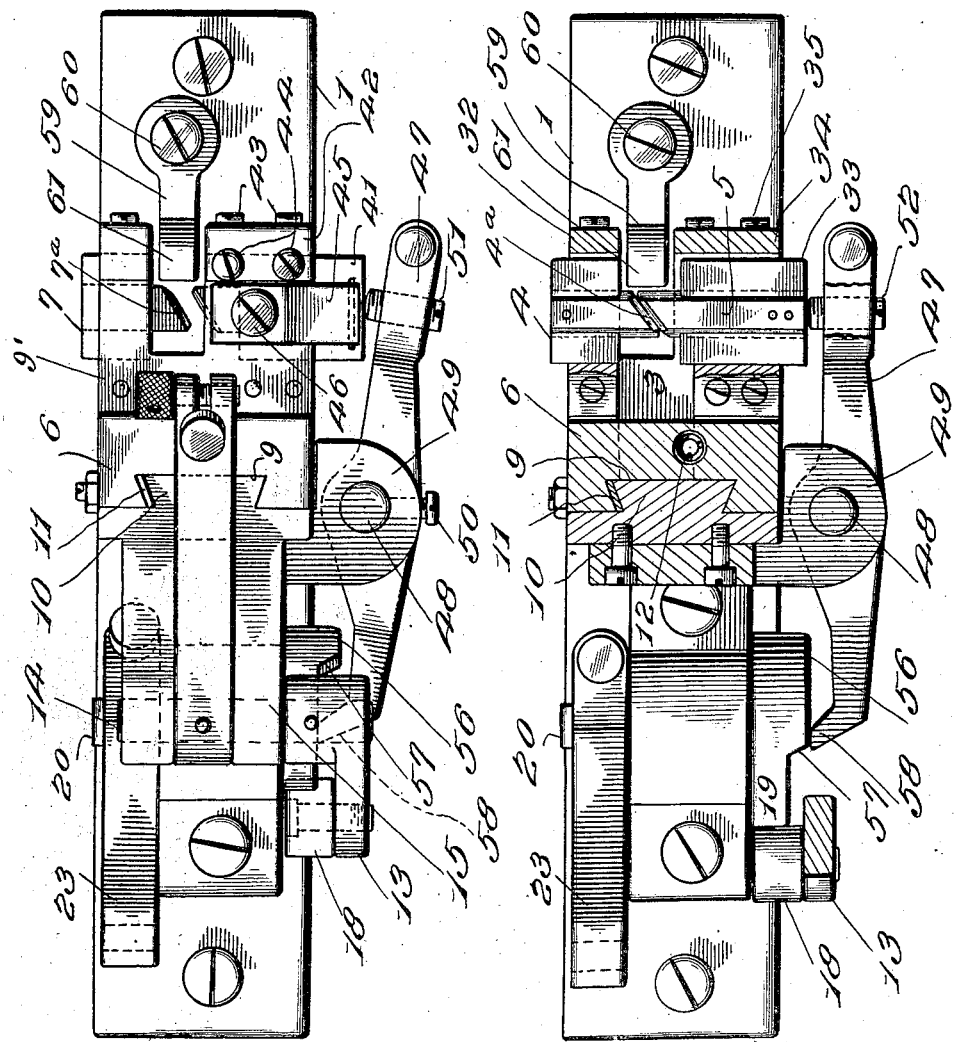

Feb. 12, 1924.
J. A. CALDER
1,483,073
RIVET CUTTING MACHINE
Filed July 13, 1921
5 Sheets-Sheet 5
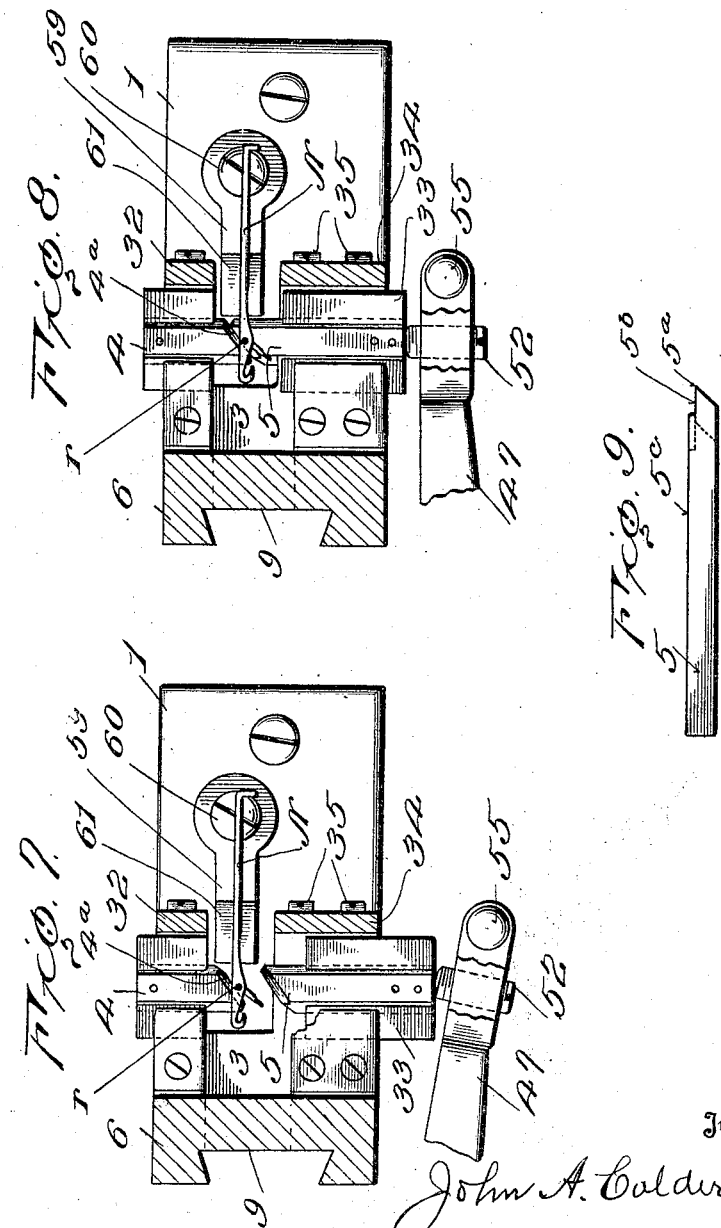
Inventor
John A. Calder
By Sturtevant Mason
Attorneys Patented Feb. 12, 1924.

1,483,073

UNITED STATES PATENT OFFICE.

JOHN A. CALDER, OF TORRINGTON, CONNECTICUT, ASSIGNOR TO THE TORRINGTON COMPANY, OF TORRINGTON, CONNECTICUT, A CORPORATION OF CONNECTICUT.

RIVET-CUTTING MACHINE.

Application filed July 13, 1921. Serial No. 484,407.

*To all whom it may concern:*

Be it known that I, JOHN A. CALDER, a citizen of the United States, residing at Torrington, in the county of Litchfield, State of Connecticut, have invented certain new and useful Improvements in Rivet-Cutting Machines, of which the following is a description, reference being had to the accompanying drawing and to the figures of reference marked thereon.

The invention relates to new and useful improvements in rivet cutting machines, and more particularly to a rivet cutting machine which operates to cut the rivet after it has been placed in the article to be riveted, and at each side of the article, leaving only sufficient projecting portions of the rivet for the heading thereof.

An object of the invention is to provide a machine of the above type with cutting devices having their cutting edges so disposed relative to the line of reciprocation of the cutters that the cutting devices may assist in supporting the article containing the rivet being cut, and with the article arranged in a line at right angles to the path of reciprocation of the cutters.

A further object of the invention is to provide a rivet cutting machine of the above type wherein the cutting devices are arranged in upper and lower pairs, and wherein the upper pair of cutting devices are movable toward and from the lower pair of cutting devices to permit the insertion of the article containing the rivet to be cut and for the holding of the article during the cutting of the rivet.

These and other objects will in part be obvious and will in part be hereinafter more fully disclosed.

In the drawings which show by way of illustration one embodiment of the invention:—

Figure 1 is a side view of the machine from the left-hand side of the machine;

Fig. 2 is a side view of the machine from the right-hand side of the machine;

Fig. 3 is a front view of the same with the cutters retracted;

Fig. 4 is a view similar to Fig. 3, but with the cutters moved forward to sever the article;

Fig. 5 is a top plan view of the machine;

Fig. 6 is a view on the line 5—5 of Fig. 1;

Fig. 7 is a view partly in horizontal section and partly in plan showing the lower pair of cutters with the cutting blades separated and the rivet in place for cutting, and Fig. 8 is a similar view but showing the lower movable cutter as having been moved forward to cut the rivet;

Fig. 9 is an enlarged side view of one of the cutters.

The invention is directed broadly to a machine for cutting a rivet after it has been placed in the article and at each side of the article preparatory to the forming of heads at each end of the rivet. The machine is particularly adapted for cutting a rivet preparatory to the riveting of a latch in a knitting needle. The cutting of the rivet is accomplished by two cooperating pairs of cutters. These cutters are preferably mounted so as to move horizontally relative to each other when cutting the rivet. The lower pair of cutters is fixed and has no vertical movement. The upper pair of cutters is moved vertically toward and from the lower pair of cutters to permit the insertion of the article carrying the rivet and for holding the article during riveting. The cutters are so constructed as to support and hold the article during cutting and at the same time permit the article being cut to extend in a direction at right angles to the line of reciprocation of the cutters. The rivet cutting machine is particularly adapted for use in an automatic gang machine for making latch knitting needles; and in this type of machine, the needle is mounted in the carrier, and the carriers travel from one machine to another for the various operations of forming and inserting a latch in the knitting needle. This type of machine to which I refer is shown and described in the patent granted to James M. Dayton, No. 1,381,810, granted June 14, 1921. The knitting needle is supported by a shank. The carriers for the knitting needle move laterally from one machine to another and are moved endwise to bring the needle into position in the machine for actuation thereon. It is therefore, desirable to support and move the knitting needle in a direction at right angles to the line of reciprocation of the cutters, when it is positioned in the machine for cutting the rivet.

Referring more in detail to the drawings, my improved rivet cutting machine consists of a supporting base 1 carrying a standard 2. Said standard 2 is provided with a forwardly projecting arm 3 on which is mounted the lower pair of cutters 4 and 5. Also mounted on the standard 2 is a reciprocating head 6, and on said reciprocating head is mounted the upper pair of cutters 7 and 8. The reciprocating head 6 has a dove-tailed recess 9 adapted to receive a dove-tailed projection 10. A wear plate 11 is provided for taking up wear between the projection and the recess in which it slides. The reciprocating head 6 is normally raised by means of a spring 12. Said head is moved downwardly against the tension of the spring 12 by a rock lever 13. Said rock lever 13 is pivoted at 14 to a bracket 15 which is secured by suitable screws to the standard 2. Said rock lever 13 carries an adjustable bolt 16 at its outer end which is adapted to bear on the upper end of the reciprocating head 6. The bolt is held in adjusted positions by a clamping screw 17 which is adapted to draw the split ends of the rock lever together to clamp the bolt. The rock lever 13 carries a roller 18 which bears on the cam 19 fixed to a shaft 20. Said cam 19 has a cut away portion 21 forming a rounded cam shoulder 22. When the shaft 20 is oscillated in a clockwise direction as viewed in Fig. 1, the cam shoulder 22 engaging the roller 18 will swing the rock lever so as to depress the reciprocating head 6 and thus move the upper pair of cutters toward the lower pair of cutters. When the shaft 20 is oscillated in the opposite direction, then the rock lever 13 is released and the spring 12 raises the reciprocating head.

Fixed to the shaft 20 is an arm 23. Said arm 23 carries a pin which engages a slot 24 in the arm 25. The arm 25 is fixed to a shaft 26. Mounted on the shaft 26 is a second arm 27 which is provided with a roller 28, and the roller 28 is adapted to engage a cam 29 on the main actuating shaft 30. A spring 31 holds the roller carried by the arm 27 in engagement with the cam on the main shaft and the spring operates through said arm 27 to rotate the shaft 20 in a counter-clockwise direction.

The cutter 4 is a stationary cutter. Said cutter is clamped to the arm 3 by means of a clamping plate 32. The cutter 5 is a movable cutter. Said cutter is carried by the reciprocating slide 33 which moves in guideways formed in the arm 3. One wall of the guideway carrying the slide 33 is formed on a plate 34. Said plate 34 is secured to the arm 3 by means of screws 35, 35, which extend through enlarged holes in the plate 34. Stop screws 36, 36 hold the plate in vertical set position. This plate has an inclined wall, and with the cut away portion in the arm 3 forms a dove-tailed recess in which the slide 33 reciprocates. The slide 33 is moved to the left by means of a spring 37 which is secured by the screws 38, 38 to a lug 39 on the base 1 of the machine.

The cutter 7 is fixed to the arm 9'. Said cutter is secured to the arm by a clamping plate 40. The cutter 8 is a movable cutter and said cutter is carried by a reciprocating slide 41 which is similar to the slide 33, and is secured in a similar manner to the arm 9' by means of a plate 42. The plate 42 is held on the arm 9' by screws 43, 43 and stop screws 44 determine its vertical position. A spring 45 normally moves the slide 41 to the left as viewed in Fig. 2. This spring is in the form of a leaf spring and is secured by a screw 46 to the arm 9'. From the above it will be apparent that the movable cutters are moved to the extreme left-hand position as viewed in Figures 2 and 3 by means of springs. The slides carrying the movable cutters are moved in the opposite direction by means of a lever 47. The lever 47 is mounted to swing freely on the pivot rod 48 fixed in the lugs 49, 49 by set screws 50. The lever is provided with an adjustable screw 51 which is adapted to engage the slide 41 and with an adjustable screw 52 which is adapted to engage the slide 33. The end of the lever is split as indicated at 53 and 54 and the clamping bolt 55 passing through the split ends serve to draw the same together and lock the screws 51 and 52 in their various adjusted positions. The lever 47 is operated by an actuating cam 56. Said actuating cam 56 is preferably formed as a part of the cam 19 and is movable therewith. Said cam 56 has an inclined shoulder 57 adapted to engage the projecting nose 58 carried by the lever 47. When the shaft 20 is moved in a clockwise direction as viewed in Fig. 1, the rock lever 13 is first oscillated to lower the movable head 6. After the movable head reaches the lower extreme of its movement, then the lever 47 is actuated to move the cutters to the right, as viewed in Fig. 2, to sever the rivet about and below the article in which it is placed. After the rivet has been cut, then the shaft 20 is moved in the opposite direction, which releases the lever 47 and the springs 37 and 45 retract the cutters, and upon further movement of the shaft 20, the movable head 6 is released and the spring 12 raises the same.

Directly in front of the cutters is a post 59 which is secured to the supporting base 1 by means of a screw 60. Said post at its upper end is bent at 61 so as to lie in a horizontal plane and the upper surface of the horizontal portion 61 is substantially flush with the upper surface of the fixed cutter 4. The cutters 4 and 7 have their cutting edges 4ª and 7ª, respectively set in a vertical plane cutting the line of reciprocation of the movable cutters at an acute angle. The cutting edges of the movable cutters 5 and 8 are similarly inclined so that when the movable cutters are pressed forward, the cutting edges will come into cooperative cutting relation.

The cutters are ground on the faces engaging the article to set back the cutting edges and thus provide sufficient rivet stock projecting beyond the cheek of the needle to form the heads. In Figure 9, I have shown the cutter 5 with the cutting edge $5^a$ set back. The surface $5^b$ is ground back parallel with the surface $5^c$. It could, of course, be otherwise ground, the essential feature being the setting back of the cutting edge. The other cutters are similarly formed.

The knitting needle, or the article carrying the rivet to be cut, is indicated at N in the drawings, and the rivet at $r$. It will be noted that the shank of the knitting needle extends in a direction at right angles to the line of reciprocation of the movable cutters. Said shank may rest on the horizontal portion 61 of the supporting post 59. The part of the needle beyond the rivet rests on the lower stationary cutter 4, while the rivet is intermediate the ends of the cutting edge $4^a$ of said stationary cutter 4. When the movable head 6 is raised and the cutters are retracted as shown in Fig. 2, the needle is placed in the machine and in the position above noted. After the needle has been placed, then the movable head 6 comes down carrying with it the upper pair of cutters. The cutter 7 will engage a portion of the needle which overlies the cutter 4 and will lightly hold or clamp the same. After the cutters have been thus positioned, then the movable cutters are pressed forward to sever the rivet. After the rivet is severed, the cutters are retracted and then the upper pair of cutters move upwardly, releasing the needle and it may be removed from the machine.

When the improved rivet cutting machine is used in a machine such as shown in the Dayton patent, the needles held by the carriers will be brought in front of the machine, then moved forward into the rivet cutting machine in a direction at right angles to the line of reciprocation of the cutters and will be thus positioned for the cutting of the rivet. The broad invention of arranging the cutters in pairs and moving one pair of cutters toward and from the other, and then moving the cutters to cut the rivet, forms the subject-matter of my co-pending application Serial No. 484,406, filed of even date herewith, and the present application is directed to the arrangement of the cutting edges in a plane cutting at an acute angle the line of reciprocation of the cutters.

It is obvious that minor changes in the details of construction and the arrangement of the parts may be made without departing from the spirit of the invention as set forth in the appended claims.

Having thus described the invention what I claim as new and desire to secure by Letters-Patent, is:—

1. A rivet cutting machine including in combination, two pairs of cooperating cutters, means for operating the cutters of the respective pairs to cut the rivet at each end thereof, means for moving one pair of cutters toward and from the other for determining the length of the rivet, said cutters having their cutting edges arranged in a plane at an acute angle to the line of reciprocation of the cutters during the cutting of the rivet.

2. A rivet cutting machine including in combination, two pairs of cooperating cutters, means for operating the cutters of the respective pairs of cutting the rivet at each end thereof, automatic means for moving one pair of cutters relative to the other for clamping and holding the article carrying the rivet to be cut, said cutters having their cutting edges lying in a plane along the line of reciprocation of the cutters for cutting the rivet at an acute angle.

3. A rivet cutting machine including in combination, two pairs of cutters, means for moving one pair of cutters toward and from the other, means for operating the cutters to cut the rivet, said cutters having their cutting edges arranged in a plane at an acute angle to the line of reciprocation of the cutters, and a supporting member located in front of the lower pair of cutters and cooperating with one of the cutting members to support the article carrying the rivet in a position substantially at right angles to the line of reciprocation of the cutters.

4. A rivet cutting machine including in combination, two pairs of cutters, automatic means for moving one pair of cutters relative to the other to hold the article carrying the rivet to be cut and for subsequently operating the cutters to cut the rivet, said cutters having their cutting edges lying in a plane cutting the line of reciprocation of the cutters at an acute angle, and a supporting member located in front of the lower pair of cutters and cooperating with one of the cutting members to support the article carrying the rivet in a position substantially at right angles to the line of reciprocation of the cutters.

5. A rivet cutting machine including in combination, a standard, a projecting arm carried thereby, a pair of cutters mounted on said arm, a movable head carried by the standard, a pair of cutters mounted on said movable head, means for moving the head to cause the upper pair of cutters to hold the article carrying the rivet to be cut, and means for moving one cutter in each pair for cutting the rivet, the cutting edges of the cutters being disposed in lines cutting the line of reciprocation of the cutters at an acute angle.

6. A rivet cutting machine including in combination, a standard, a projecting arm carried thereby, a pair of cutters mounted on said arm, a movable head carried by the standard, a pair of cutters mounted on said movable head, means for moving the head to cause the upper pair of cutters to hold the article carrying the rivet to be cut, means for moving one cutter in each pair for cutting the rivet, the cutting edges of the cutters being disposed in lines cutting the line of reciprocation of the cutters at an acute angle, and a supporting member located in front of the cutters and cooperating with one of the cutting members in supporting the article carrying the rivet to be cut and while held in a line at right angles to the line of reciprocation of the cutters.

7. A rivet cutting machine including in combination, two pairs of cutters, a movable head carrying one pair of cutters, a rock lever for moving said head downwardly, an adjustable bolt carried by the rock lever and engaging said movable head, a spring for raising said movable head, and means for operating the cutters after the head has been lowered to hold the article for cutting the rivet, said cutters having their cutting edges arranged in a line cutting the line of reciprocation of the cutters at an acute angle.

8. A rivet cutting machine including in combination, two pairs of cutters, a movable head carrying one pair of cutters, a rock lever for moving said head downwardly, an adjustable bolt carried by the rock lever and engaging said movable head, a spring for raising said movable head, means for operating the cutters after the head has been lowered to hold the article for cutting the rivet, said cutters having their cutting edges arranged in a line cutting the line of reciprocation of the cutters at an acute angle, and a supporting member located in front of the cutters and cooperating with one of the cutting members for supporting the article carrying the rivet while held in a line substantially at right angles to the line of reciprocation of the cutters.

In testimony whereof, I affix my signature.

JOHN A. CALDER.